United States Patent
Tang et al.

(10) Patent No.: US 9,584,619 B2
(45) Date of Patent: Feb. 28, 2017

(54) BUSINESS WEB APPLICATIONS LIFECYCLE MANAGEMENT WITH MULTI-TASKING ABILITY

(71) Applicants: Simon Tang, Shanghai (CN); Xiao Xu, Shanghai (CN); William Cui, Shanghai (CN); Jianrong Yu, Shanghai (CN); Luis Lu, Shanghai (CN); Jonny Chen, Shanghai (CN); Jay Wang, Shanghai (CN); Ming-hui Cao, Shanghai (CN)

(72) Inventors: Simon Tang, Shanghai (CN); Xiao Xu, Shanghai (CN); William Cui, Shanghai (CN); Jianrong Yu, Shanghai (CN); Luis Lu, Shanghai (CN); Jonny Chen, Shanghai (CN); Jay Wang, Shanghai (CN); Ming-hui Cao, Shanghai (CN)

(73) Assignee: SAP SE, Walldorf (DE)

( * ) Notice: Subject to any disclaimer, the term of this patent is extended or adjusted under 35 U.S.C. 154(b) by 364 days.

(21) Appl. No.: 14/465,103

(22) Filed: Aug. 21, 2014

(65) Prior Publication Data
US 2016/0057244 A1 Feb. 25, 2016

(51) Int. Cl.
*G06F 15/167* (2006.01)
*H04L 29/08* (2006.01)
*H04W 4/18* (2009.01)

(52) U.S. Cl.
CPC .......... *H04L 67/2842* (2013.01); *H04W 4/18* (2013.01)

(58) Field of Classification Search
None
See application file for complete search history.

(56) References Cited

U.S. PATENT DOCUMENTS

| | | |
|---|---|---|
| 7,007,237 B1 | 2/2006 | Sharpe |
| 7,013,423 B2 | 3/2006 | Blaschke et al. |
| 7,523,409 B2 | 4/2009 | Yolleck et al. |
| 7,685,260 B2 | 3/2010 | Fukuda et al. |
| 7,685,526 B2 | 3/2010 | Klinger |
| 7,765,255 B2 | 7/2010 | Cherdron et al. |
| 8,195,767 B2 | 6/2012 | Albrecht et al. |
| 8,224,823 B1 | 7/2012 | Amacker |
| 8,250,478 B2 | 8/2012 | Dharmarajan et al. |
| 8,312,450 B2 | 11/2012 | Gangadharappa et al. |

(Continued)

*Primary Examiner* — Philip Chea
*Assistant Examiner* — Van Kim T Nguyen
(74) *Attorney, Agent, or Firm* — Fountainhead Law Group P.C.

(57) ABSTRACT

Technical solutions for managing business application life cycle with multi-tasking ability are provided. In some implementations, a method includes: at an enterprise data processing application: (A) activating a first application page, which includes: loading a first data set from a first data source, and causing the first data set to be displayed on the first application page; (B) switching from the first application page to a second application page, by: deactivating, without closing, the first application page, including: causing the first data set to be stored in a temporary storage; and activating a second application page; and (C) switching from the second application page back to the first application page, by: deactivating, without closing, the second application page; and re-activating the first application page, including: loading the first data set from the temporary storage, and causing the first data set to be displayed on the first application page.

18 Claims, 7 Drawing Sheets

(56) References Cited

U.S. PATENT DOCUMENTS

| | | |
|---|---|---|
| 8,402,011 B1 | 3/2013 | Bodenhamer |
| 8,458,612 B2 | 6/2013 | Chatterjee et al. |
| 8,499,065 B2 | 7/2013 | Ross et al. |
| 8,505,025 B2 | 8/2013 | Nakamura |
| 2006/0129424 A1* | 6/2006 | Chan .................. G06Q 30/02 705/1.1 |
| 2007/0213984 A1* | 9/2007 | Ativanichayaphong G06F 3/167 704/257 |
| 2013/0086529 A1* | 4/2013 | Singh .................. G06F 3/0484 715/854 |
| 2013/0250825 A1* | 9/2013 | Gosal ................ H04W 52/0232 370/311 |
| 2014/0019523 A1 | 1/2014 | Heymann et al. |
| 2014/0218392 A1* | 8/2014 | Moore ................ G09B 29/106 345/619 |

\* cited by examiner

BUSINESS WEB APPLICATIONS LIFECYCLE MANAGEMENT WITH MULTI-TASKING ABILITY

BACKGROUND

Managing life cycle for data processing applications—especially enterprise data processing applications—is important: data processing application often consumes significant computing resources, e.g., when loading, transmitting, or visualizing large data sets.

Difficulties abound, however. One technical problem is that an application's performance is often times limited by the speed of the several networks (e.g., a cellular network, a cable network, and a WIFI network) over which data are transmitted. For example, loading 100 MB data from a remote enterprise data server to a user's IPAD device via a 10 Mbps cable network and an in-home WIFI network may take several minutes, causing an appreciable amount of user frustration.

Another technical problem is that, data transmissions often takes a significant toll on a device's power usage. This problem is exacerbated when involved are tablet computers (e.g., an APPLE IPAD device) and smartphones (e.g., an APPLE IPHONE device), both of which rely heavily on battery powers.

A third technical problem is that, frequent data transmissions consume significant computing power, causing other applications (sometime even a device itself) to "freeze."

There therefore is a need for improved techniques for detecting potential data quality problems.

DETAILED DESCRIPTION

The implementations described herein provide various technical solutions to managing enterprise data processing application life cycle, and in particular to the above-identified technical problems—by providing techniques for reusing data that have been previously transmitted to and stored on a local temporary storage, thereby avoiding frequent (and often costly) data re-transmissions.

For reasons explained above, re-transmission of large data sets should be avoided or minimized. Because such re-transmissions consumes a significant amount of computing resource and network bandwidth, which often lead to performance issues, such as application freeze or lengthy response time. Therefore, it may be advantageous to enable an enterprise data processing application to reuse data previously downloaded from a remote storage (e.g., a data server) and presently stored in a local storage (e.g., a RAM chip).

As a non-limiting example, when a data processing application loads an application page (as defined below) for the first time, data to be displayed on the application page are transmitted from a remote data server to a mobile computing device (e.g., a smartphone), also for the first time. These data are then displayed on the application page to a user.

Next, when the user leaves the current application page for another application page (e.g., switching to a different page), however, instead of destroying data associated required for the current page, the computing device (A) places the current page in the background of the data processing application; and (A) stores the data in a local data storage (e.g., such as a local computer memory). The page and corresponding are saved from being destroyed for a predefined time period (e.g., an expiration time), so as to provide the mobile device an opportunity to reuse these data.

Therefore, when the user comes back to this application page again, the computing device can (A) replace the page (from the background) into the foreground; and (B) reuse data from the local storage for display on the application page—thereby avoiding a rather costly data re-transmission from the remote data server.

In these ways, frequent data re-transmissions, as well as power and computing resource consumption required by these re-transmissions, are reduced or eliminated. These techniques are advantageous, in particular when a computing device is running on limited power supplies (e.g., battery), constrained computing power, low network bandwidth, or a combination of these factors.

Additional details of implementations are now described in relation to the figures.

Figure 1:
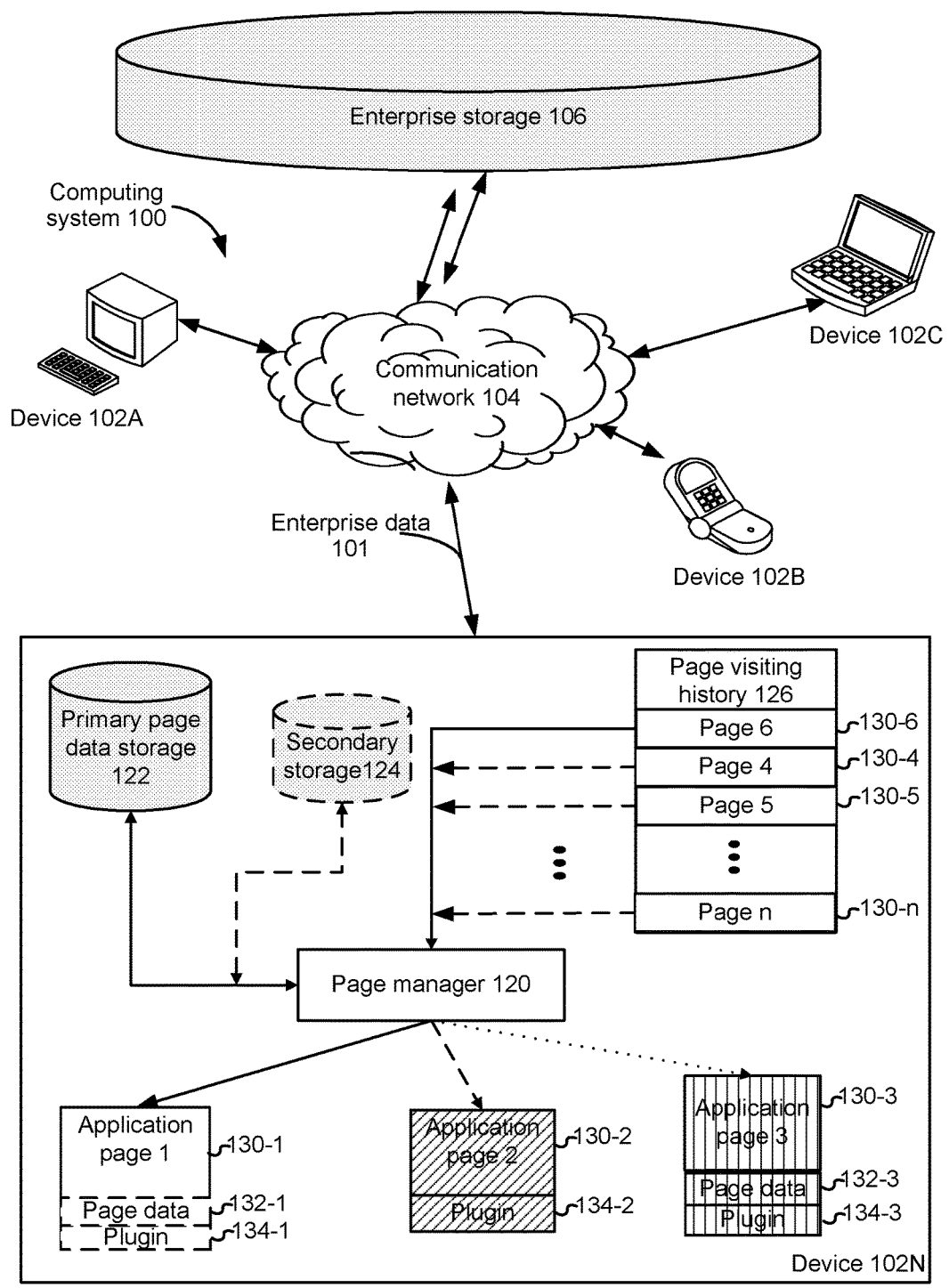
FIG. 1 is an example block diagram illustrating a computing system for managing enterprise data processing application life cycle, in accordance with some implementations.

FIG. 1 is an example block diagram illustrating a computing system for managing enterprise data processing application life cycle, in accordance with some implementations.

In some implementations, the computing system 100 includes one or more computing devices 102 (e.g., 102-A, 102-B, ..., and 102-N), a communication network 104, and an enterprise storage 106.

In some implementations, the enterprise storage 106 stores and manages enterprise data 101, e.g., for user consumption at a computing device 102. In some implementations, the enterprise data include business data, such as sales/expenses/revenues, customer profiles, and supplier profiles. In some implementations, the enterprise storage 106 is implemented using transitory storage (e.g., RAM and flash memory) and non-transitory storage (e.g., hard drive, ROM, DVD, and tape). In some implementations, the enterprise storage 106 includes one or more databases, for example, a MICROSOFT SQL Server database, an Oracle database, or a SYBASE database.

In some implementations, the communication network 104 interconnects one or more computing devices 102 with each other, and with the enterprise storage 106. In some implementations, the communication network 104 optionally includes the Internet, one or more local area networks (LANs), one or more wide area networks (WANs), other types of networks, or a combination of such networks.

In some implementations, a computing device 102 obtains data from appropriate data sources (e.g., the primary page data storage 122, the secondary storage 124, or the enterprise storage 106) and display these data (or a portion thereof) to a user, e.g., so that the user can analyze these data and further derive business intelligence and strategy.

In some implementations, the computing device 102 is a mobile computing device, such as a laptop computer, a notebook computer, a desktop computer, a smartphone, or a tablet computer. In some implementations, the computing device 102 runs on a limited power supply, e.g., a cell phone battery, a tablet battery, a small capacity power bank. In other words, the computing device 102 is operating with a limited power supply. In some implementations, the computing device 102 is not connected to a regular power supply, for example, a laptop unconnected to a power outlet, because it is being used by a user on a commuter train, in a mid-air flight, or on a beach.

In some implementations, the computing device 102 is not presently connected, via the communication network 104, with the enterprise storage 106. In other words, the computing device 102 is operating in an off-line mode, e.g., without a live connection to the enterprise storage 106. For example, the computing device 102 is an APPLE IPAD device that is not connected to the Internet, e.g., because these is no WIFI connection available.

In some implementations, the computing device 102 obtains data from appropriate data sources (e.g., the primary page data storage 122, the secondary storage 124, or the enterprise storage 106) and display these data (or a portion thereof) to a user, e.g., so that the user can analyze these data and further derive business intelligence and strategy.

In some implementations, a computing device 102 includes a page manager 120, a primary page data storage 122, a secondary storage 124, and a page visiting history 126. In some implementations, the page manager 120, the primary page data storage 122, the secondary storage 124, and the page visiting history 126 are part of a web based application running on the computing device.

In some implementations, the page manager 120 manages one or more applications pages, as well as data and plugins associated therewith. In some implementations, an application page is a user interface displayed to a user at a predefined stage. For example, a data-display user interface, in a data processing application, constitutes an application page; so do a data-editing user interface and a data-comparison user interface.

In some implementations, the page manager 120 manages an application page by placing or maintaining it in various different states: e.g., an initial state, an active state, an inactive state, or a destroyed state.

For instance, if a data-display page includes 2 data tables and 20 images, when deactivating the data-display page, the page manager places the data-display page in background (without closing down the page), and stores the 2 data tables and 20 images in a computer memory (e.g., for faster future reference) in association with the data-display page. For another instance, if an application page includes 2 plugins (e.g., methods or routines for page initialization), the 2 plugins (e.g., one for loading data tables, and the other for loading images) will be initiated or executed, when the application page is initialized (e.g., loaded for the first time for displayed to a user, sometime also called instantiated).

In some implementations, an application page is in an "initial" state (or has been initiated or instantiated) if data associated with (e.g., for display on) the application page have been retrieved (in full or in part) from appropriate data sources, e.g., the enterprise storage 160, the primary page data storage 122, or the second storage 124.

In some implementations, an application page becomes "active" once fully initiated (or instantiated). In some implementations, an application page is "active" (or has been activated, e.g., the application page 130-1) if the application page (or a portion thereof) is being displayed (e.g., visible) to a user, or has been placed in the foreground of an application (e.g., running in the foreground). For example, an Internet browser is active if it is being displayed to a user, e.g., in a full screen mode or in a regular mode.

In some implementations, an application page is "inactive" (or has been de-activated, e.g., the application page 130-2) if it is hidden from display (e.g., invisible) to a user, has been minimized, or has been placed in the background (e.g., running in the background). For example, an Internet browser is inactive if it has been minimized (to a tool bar) or reduced to an icon.

In some implementations, an application page is in a "destroyed" state (or has been destroyed, e.g., the application page 130-3) if its associated data are removed from the primary data storage 122, the second storage 124, or both. In some implementations, an application page is in a "destroyed" state if, to display the application page to a user, the device 102 needs to retrieve its associated data from the enterprise storage 106 or any other data sources outside the device 102.

As shown in FIG. 1, the application page 130-1 is in the "active" state and includes both page data 132-1 and plugin 134-1; the application page 130-2 is in the "inactive" state and includes plugin 134-2; and the application page 130-3 is in the "destroyed" state and includes both page data 132-3 and plugin 134-3, both of which have been destroyed (e.g., removed from the primary page data storage 122).

In some implementations, the primary page data storage 122 manages and stores data associated with an application page (e.g., active or inactive). In some implementations, the primary page data storage 122 includes transitory data storage, e.g., for faster data access. In some implementations, the primary page data storage 122 temporarily stores (on the computing device 102) data retrieved from the (e.g., remote) enterprise storage 106, and reuses these data by providing them back to an application when needed (e.g., when an application page is refreshed or displayed again).

In some implementations, the primary page data storage 122 includes a RAM chip (e.g., a regular computer memory) or an SRAM chip (e.g., a cache memory). In some implementations, an SRAM chip is used due to its reduced power consumption or increased data access speed (e.g., compared to a RAM chip or a hard drive). In some implementations, the primary page data storage 122 is configured such that loading data from the primary page data storage 122 consumes less electrical (e.g., battery) power than loading the enterprise storage 106. In some implementations, the primary page data storage 122 provides data to an enterprise data processing application faster compared to the enterprise storage 106.

In some implementations, the secondary storage 124 also manages and stores data associated with an application page (e.g., active or inactive). In some implementations, the secondary storage 124 operates as a backup (or overflow) storage to the primary page data storage 124. In some implementations, the secondary storage 124 includes a RAM chip, e.g., due to its reduced power consumption or increased data access speed (compared to a hard drive). In some implementations, the secondary storage 124 is configured such that loading data from the secondary storage 124 consumes less electrical (e.g., battery) power than loading the enterprise storage 106. In some implementations, the secondary storage 124 provides data to an enterprise data processing application faster compared to the enterprise storage 106.

In some implementations, the page visiting history 126 includes a sequence of user's activities within an application, for example, an ordered sequence of application UI modules visited (e.g., data loading module, data editing module, chart generation module, and data saving module) or web pages viewed (page 1, page 2, page 3 . . . ).

In some implementations, the page visiting history 126 is implemented using a stack structure (First-In-Last-Out). In other implementations, the page visiting history 126 is implemented using a queue structure (First-In-First-Out) or a tree (binary or otherwise) structure.

Figure 2:
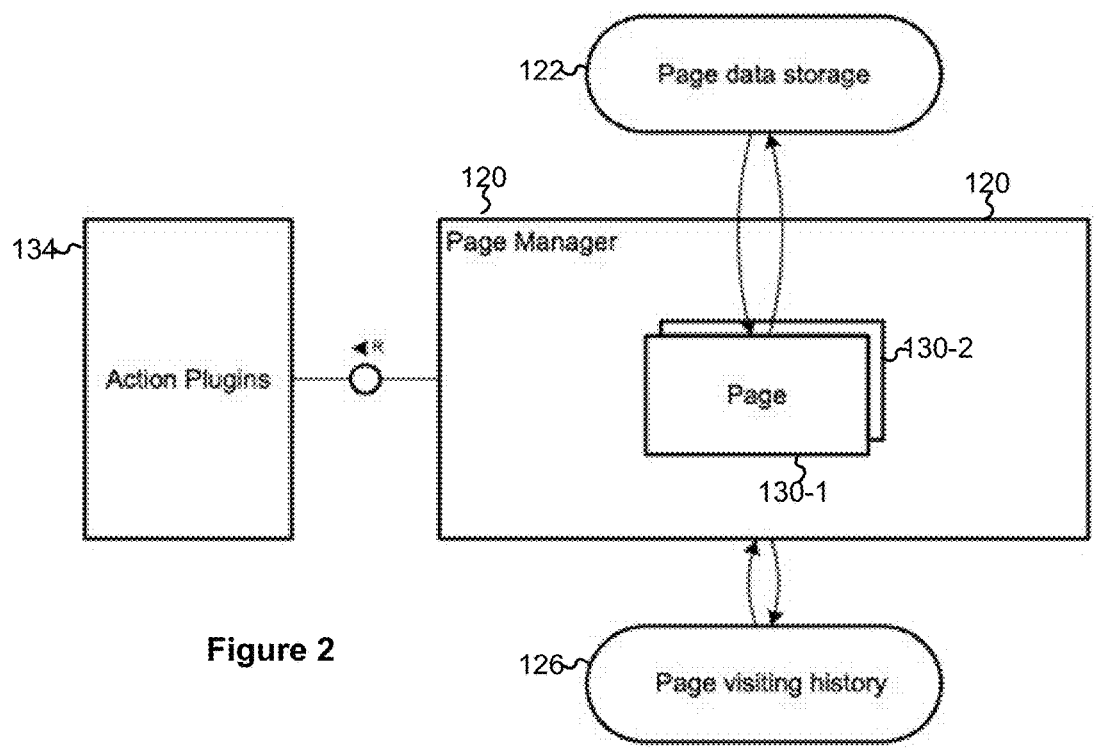
FIGS. 2-7 are example flow charts illustrating various methods for managing enterprise data processing application life cycle, in accordance with some implementations.

FIG. 2 is an example flow chart illustrating a method for managing enterprise data processing application life cycle, in accordance with some implementations.

As shown in FIG. 2, in some implementations, the page manager 120 manages the page visiting history 126 and the primary page data storage 122, in accordance with the manner in which a user visits various application pages. For example, when a user switches from the application page 130-1 (e.g., for display gross profit data using 5 data tables) to the application page 130-2 (e.g., for display expense data using a pie char and a bar chart), the page manager 120 stores data in the 5 data tables temporarily into the primary page data storage 122—e.g., an RAM chip built into the device 102—and modifies the page visiting history 126 to indicate that the user was visiting the page 130-1, but is now switching to page 130-2. Here, the page manager 120 uses the page data storage 122 as a temporary data storage, because in case that the user returns to the page 130-1, these data (e.g., the 5 data tables) can be reused (or recycled from the temporary storage, e.g., the RAM chip).

To continue with the above example, when the user, after reviewing the expense data on the page 130-2, decides to go back the page 130-1 (e.g., by clicking a "backward" button on a toolbar in the enterprise data processing application), the page manager 120 reloads (e.g., reuses or recycles) data from the primary page data storage 122—rather than retrieving data from the enterprise storage 106 anew—and re-activates (e.g., re-displays) the page 130-1 for the user.

These techniques are advantageous. First, retrieving (or reusing) data from a local storage (e.g., the primary page data storage 122) is often times much faster than from a remote storage (e.g., the enterprise storage 106).

Second, the primary page data storage 122 provides faster data access speed (e.g., by using RAM, DRAM, SRAM chips, or a combination thereof) than does the enterprise storage 106 (e.g., hard disk arrays, DVDs, or tapes).

Third, the primary page data storage 122 (e.g., by using RAM, DRAM, SRAM chips, or a combination thereof) consumes less power from the often limited power supplies (e.g., a smart phone battery) to the device 102, thereby extending a device 102's operating time. This is advantageous for such situations as, when a user is using a mobile device without regular power supply, e.g., while travelling on a train, a flight, or a ferry; during a power outage; and at a remote location (e.g., a camp site in a national park).

Fourth, off-line data access is also enabled, because even if a device is not connected to a remote data storage (e.g., the enterprise storage 106), due to a lack of Internet connection, the device can reuse local data (that have been previously retrieved from the remote data storage). This is useful for such situations as, when a user is using a tablet computer device without an Internet or WIFI connection, e.g., while travelling on a flight or a highway; during a network outage; at a remote location (e.g., a work site in a Nevada desert).

Figure 3:
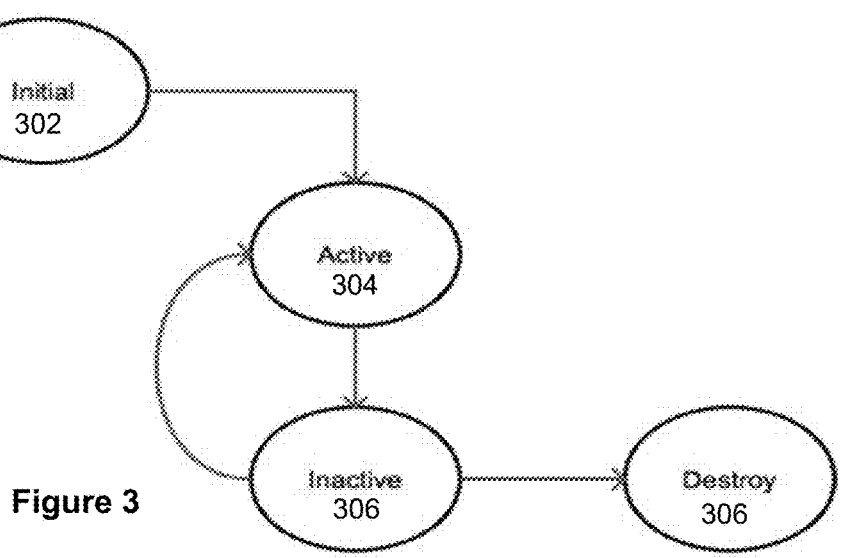

FIG. 3 is an example flow chart illustrating a method for managing enterprise data processing application life cycle, in accordance with some implementations.

Figure 4:
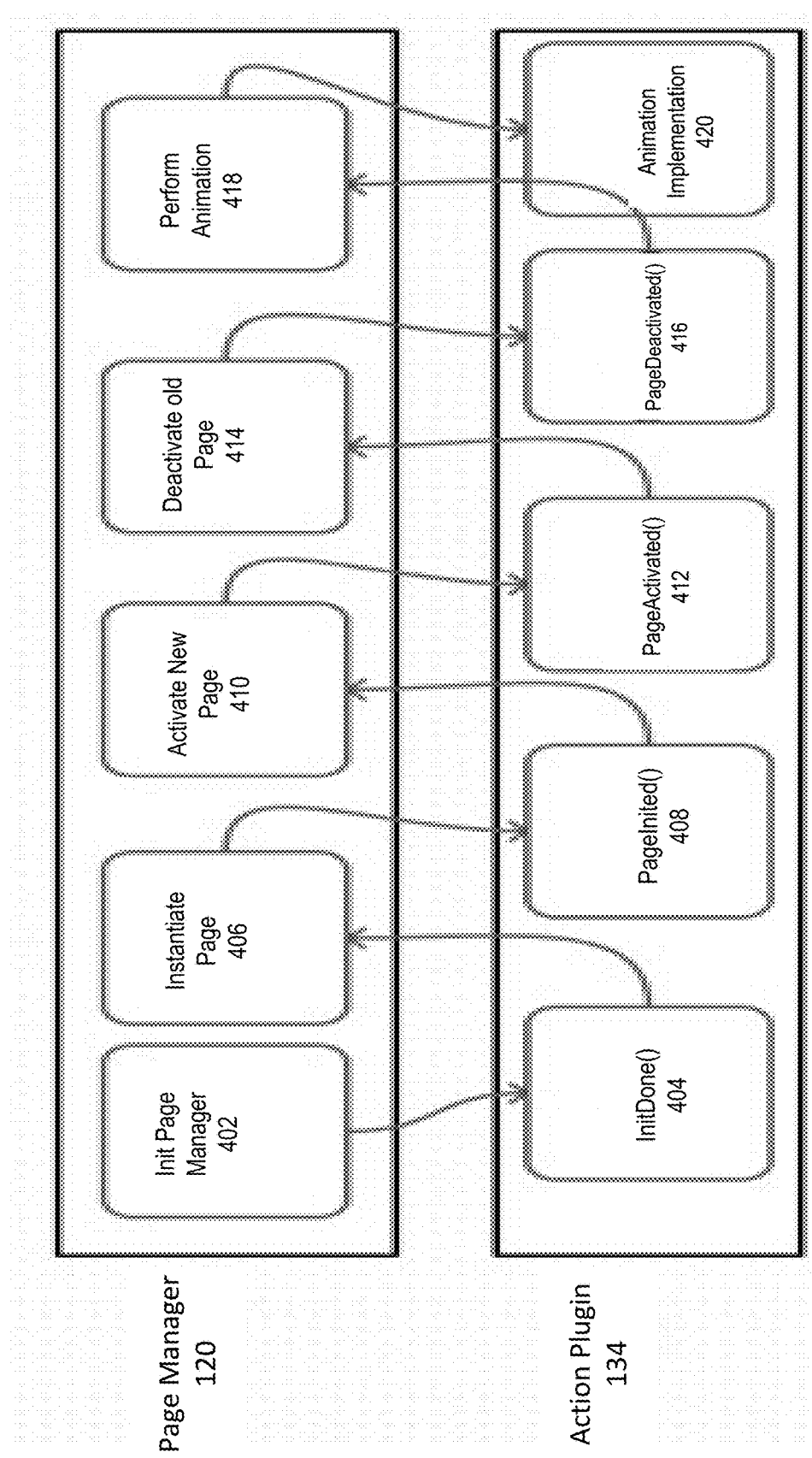

As shown in FIG. 4, when loaded for the first time, an application page is initialized (or instantiated) and therefore enters the initial state (302). For example, when a user enters a data-viewing module for the first time, data required for display on the data-viewing module (e.g., 2 data tables, 1 bar chart, and 3 images) are loaded from a remote data server (e.g., the enterprise storage 106), and plugins (e.g., software programs, methods, or routines) for formatting (e.g., resizing or aligning) these data are also executed so that the data are displayed properly to a user.

Note that an application plugin is customizable or extendable. For example, methods for invoking animations during page transitions can be added to an existing plugin, by way of an update to the plugin. For example, a plugin for re-arranging data based on a user's customized monitor resolution can be modified (e.g., added, removed, or changed). For a further example, a plugin for loading data from different (or additional) data sources can be added to an application page, by way of a user customization.

As also shown in FIG. 4, once an application page is initialized (or instantiated), it become active (304), after a predefined time period (e.g., as soon as all data required by the application page are downloaded).

An application page become inactive (306), when it is placed in background (e.g., minimized or hidden from display to a user). In some implementations, an application page becomes inactive when a user switches to a different page (thereby placing the instant page in background).

As also shown in FIG. 4, an application page is destroyed (306) (e.g., its data and corresponding entry removed from the primary page data storage 122 and the page visiting history 126, respectively), when a user closes the page or exits a data processing application of which the page is a part. In some implementations, once an application page is destroyed, its associated data (e.g., data tables or images) need to be retrieved (again) from the enterprise storage 106, in order to display the page again.

FIG. 4 is an example flow chart illustrating a method for managing enterprise data processing application life cycle, in accordance with some implementations.

A shown in FIG. 4, in some implementations, the page manager is initialized (or instantiated) by executing the "Init Page Manager" command 402, which in turn activates the action plugin "initDone( )" 404.

In some implementations, once activated, the page manager 120 initializes an application page by executing the "Instantiate Page" command 406, which in turn activates the action plugin "PageInited( )" 408.

A shown in FIG. 4, in some implementations, the page manager activates new pages 410 and deactivates old pages by executing the action plugins "PageActivated( )" 412 and "PageDeactivated( )" 416, respectively. In some implementations, de-activating an active page (e.g., page 1) and activating another (existing-but-currently deactivated or new) page (e.g., page 2) includes replacing the active page (e.g., page 1) with the other page (e.g., page 2). In some implementations, replacing a page with another page includes causing any user interface aspects of the page to become invisible from a user such that no visual indication as to the existence of the page (e.g., an icon, a tab in a browser, a tip bar) exists or is shown to the user. By this way, placing a page in the background is transparent to a user.

In some implementations, the page manager 120 performs animations, to allow a smoother transition from an old (e.g., existing) page 1 to a new (or another existing) page 2, by executing the action plugin "Animation Implementation"420.

Figure 5:
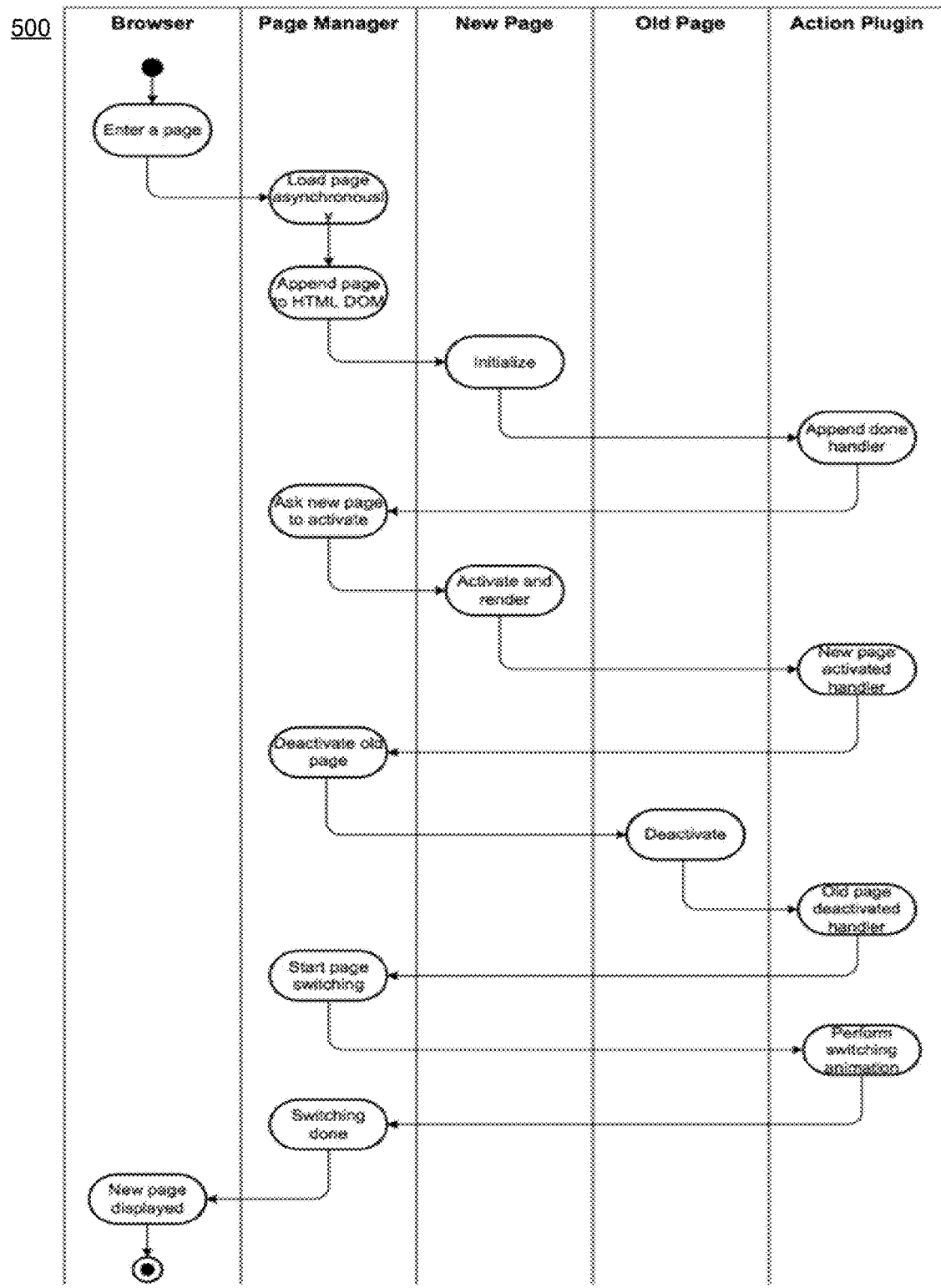

FIG. 5 is an example flow chart illustrating a method 500 for managing enterprise data processing application life cycle, in accordance with some implementations.

As shown in FIG. 5, in some implementations, an enterprise data processing application is web-based; and application pages (within the data processing application) are displayed in a browser, e.g., a MICROSOFT INTERNET EXPLORER browser or a MOZZILA FIREFOX browser.

Figure 6:
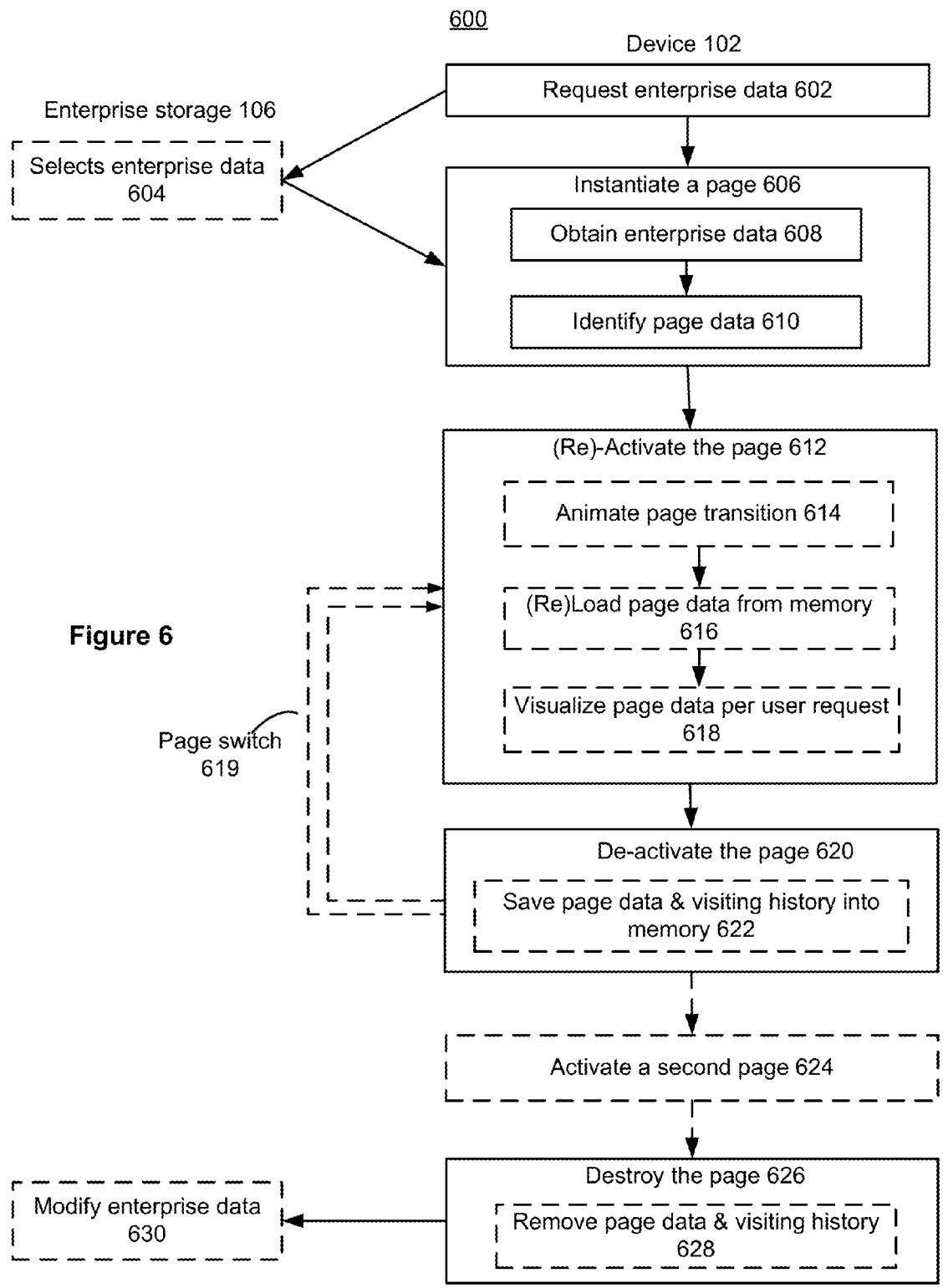

FIG. 6 is an example flow chart illustrating a method 600 for managing enterprise data processing application life cycle, in accordance with some implementations.

In some implementations, responsive to a predefined user action (e.g., a request for displaying data), a computing device 102 (e.g., an IPAD device) requests (602), from the enterprise storage 106, enterprise data.

In some implementations, the enterprise storage 106 selects (604) enterprise data requested by the device 102, and transmits the enterprise data (or a portion thereof) to the device 102.

In some implementations, the device instantiates (606) an application page, by obtaining (608) the enterprise data and identifies (610) page data (data specifically needed for displaying the application page).

In some implementations, the device (via the page manager 120) activates (612) the application page, e.g., causing the application page to be displayed to a user or placed in the foreground of the enterprise data processing application.

In some implementations, if the application page (and corresponding page data) is activated for the first time, the device 102 loads page data (or a portion thereof) that have been received from the enterprise storage, and visualizes (618) the page data (or a portion thereof) in accordance with a predefined user request (e.g., click on an icon to expand data table).

In some implementations, when a user switches to a different application page (e.g., by invoking a different application module), the device (via the page manager 120) deactivates (620) the application page (e.g., by causing the application page to be hidden form display to a user or placed in the background of the enterprise data processing application).

In some implementations, as part of the process for de-activating the application page, the device (via the page manager 120) saves (1) the page data associated with the application page, and (2) page visiting history—into the local memory (e.g., a RAM or SRAM chip) of the device 102.

In some implementations, as part of de-activating the application page, the device (via the page manager 120) saves (1) the page data associated with the application page, and (2) page visiting history—into the local memory (e.g., a RAM or SRAM chip) of the device 102. These techniques are advantageous: reusing data from local storage is usually faster than retrieving data from remote storage; loading data from transitory storage (e.g., RAM or SRAM chips) is not only faster, but also more power efficient, than loading data from non-transitory storage (e.g., hard drives, DVDs, or tapes); recycling local data also allows an data processing application work in off-line mode.

In some implementations, to complete a page switch (or transition), the page manager 120 activates (624) a second application page. In some implementations, the second application page is activated (e.g., displayed) before the first page is de-activated (e.g. hidden from display). In some implementations, the second application page is activated (e.g., displayed) after the first page is de-activated (e.g. hidden from display). In other implementations, the second application page is activated (e.g., displayed) while the first page is being de-activated (e.g. hidden from display).

In some implementations, after activating the second application page (and staying on the second page for a predefined time period), a user switches back the first application page. In some implementations, responsive to a page switch 619, the device 102 looks up the page visiting history 126 and determines that the first application page was the last page visited the user. In accordance with this determination, the device 102 reloads data associated with the first application page from the primary page data storage 122—rather than from the enterprise storage 106 again— and prepares these day for display (again) on the first application page.

In some implementations, the device 102 determines that the use has not gone back to a previously-visited page after a predefined time period (e.g., 15 minutes or an hour), the device destroys (626) that page, e.g., to conserve storage room in the primary page data storage 122 (which often has a more limited storage capacity than the enterprise storage 106). In some implementations, destroying an application page includes removing (628) corresponding page data from the primary page data storage and corresponding entry in the page visiting history 126.

In some implementations, where a user changes page data (e.g., editing an entry in a data table display on an application page), the device 102 transmits these data updates to the enterprise storage 106, which in turn modifies the enterprise data stored thereon.

Figure 7:
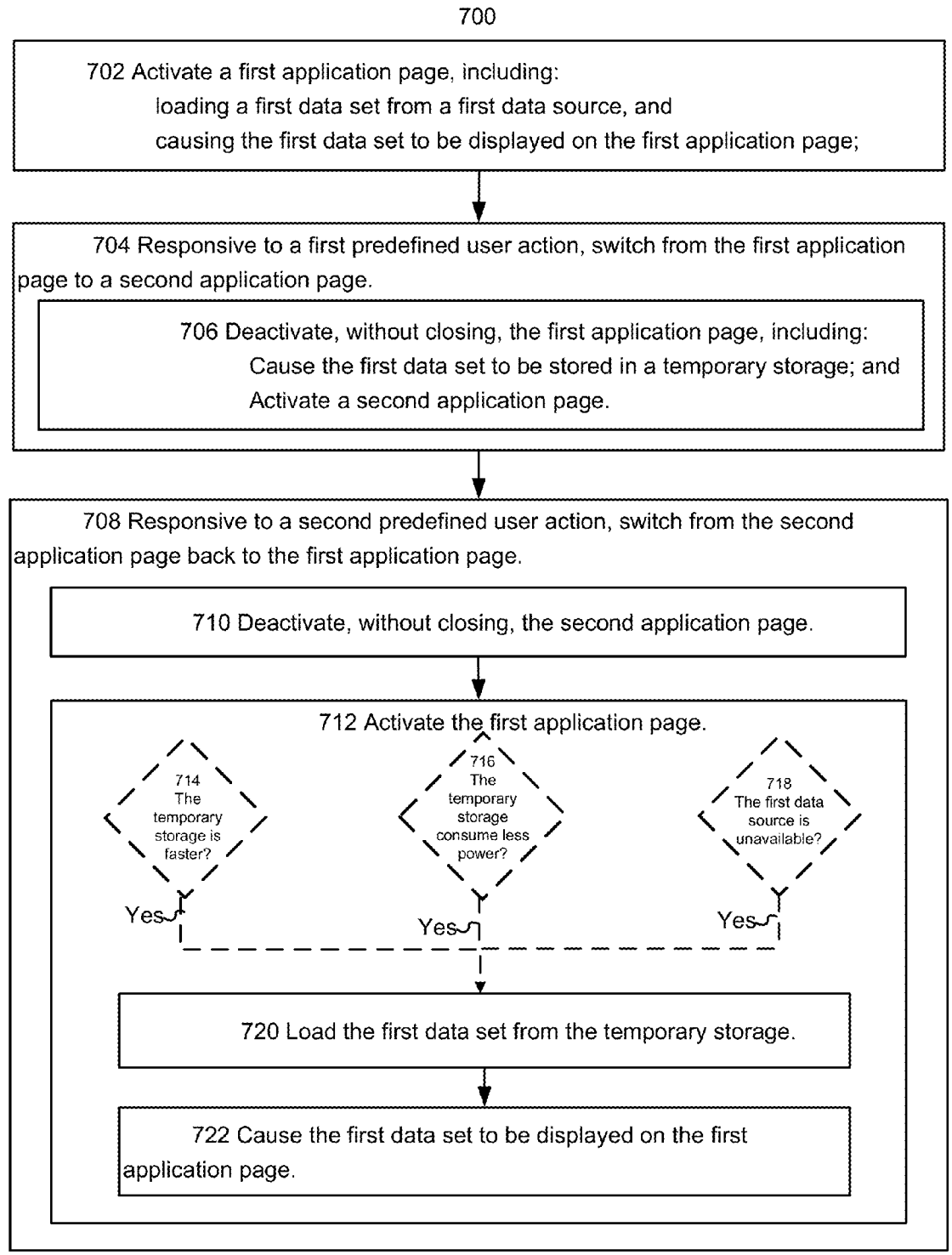

FIG. 7 is an example flow chart illustrating a method 700 for managing enterprise data processing application life cycle, in accordance with some implementations.

In some implementations, the method is implemented at a computing device (e.g., a laptop, a notebook, a tablet computer, and a smart phone) equipped with one or more processors and memory storing one or more programs for execution by the one or more processors.

In some implementations, the method is executed in an enterprise data processing application, such as an SAP ANYWHERE application. In some implementations, the enterprise data processing application is provided by e.g., SAP, QLIK, or TABLEAU. In some implementations, the method is executed on platforms provided by SAP, ORACLE, AMAZON WEB SERVICES, IBM, or PIVOTAL.

In some implementations, the method includes (A) activating a first application page, which includes: loading a first data set from a first data source, and causing the first data set to be displayed on the first application page.

In some implementations, the method also includes (B) responsive to a first predefined user action, switching from the first application page to a second application page, which includes deactivating, without closing, the first application page, and activating a second application page. In some implementations, deactivating, without closing, the first application page, includes causing the first data set to be stored in a temporary storage; and In some implementations, the method further includes (C) responsive to a second predefined user action, switching from the second application page back to the first application page, which includes: deactivating, without closing, the second application page; and re-activating the first application page. In some cases, when a user is switching from the second page back to the first page, the data processing application deactivates the second page (e.g., placing the second page in the background), and re-activates the first page. Placing an application page in the background, rather than closing it completely, is advantageous, especially in a data processing application, as reloading and retransmitting data required for a page make take a significant amount of time, and thus reusing data in these situations may significantly improve application performance.

In some implementations, when deactivated, the first application page is placed in the background (e.g., hidden from display) of the enterprise data application. In some implementations, the first application page continues its associated processing tasks (e.g., continue to load data from the enterprise storage or continue to generate a bar chart), after being placed in the background. Note that, in some cases, while the first application page is continuing its processing tasks, the second application page is also processing its own tasks in the foreground of the data processing application. These techniques are advantageous, as they equipped the enterprise data processing application with multi-tasking abilities.

In some implementations, re-activating the first application page includes loading the first data set from the temporary storage, and causing the first data set to be displayed on the first application page. In some implementations, after reloading data from the temporary local storage, the data processing application displays (e.g., formats) the data for display to a user.

In some implementations, deactivating, without closing, the first application page, includes: placing the first application in background of the enterprise data processing application. In some cases, when deactivated, the first application page is placed in the background (e.g., hidden from display) of the enterprise data application. In some implementations, the first application page continues its associated processing tasks (e.g., continue to load data from the enterprise storage or continue to generate a bar chart), after being placed in the background. Note that, in some cases, while the first application page is continuing its processing tasks, the second application page is also processing its own tasks in the foreground of the data processing application. These techniques are advantageous, as they equipped the enterprise data processing application with multi-tasking abilities.

In some implementations, the temporary data source is associated with a greater data transmission speed (714) than that associated with the first data source. For example, when the temporary storage is manufactured using storage mediums that provides faster data access than the first data source (e.g., a RAM chip, a DVD disc and a DVD drive, respectively), it may be advantageous to reload data form the temporary storage than from the first data source. This is particularly advantageous when the same data must be load frequently, for example, when a user frequently switches back and forth to between different application pages.

In some implementations, the temporary data source is used when the first data source is not available (718). For example, data are reload from a local temporary storage during a network outage, to enable the processing application to function, to the extent possible, during an off-line mode.

In some implementations, loading the first data set from the temporary storage consumes (716) less electrical power than loading the first data set from the first data source. For example, when the temporary storage is manufactured using storage mediums that consume less power than the first data source (e.g., a RAM chip, a DVD disc and a DVD drive, respectively), it may be advantageous to reload data form the temporary storage than from the first data source. This is particularly advantageous when the computing device is running on limited power supplied, e.g., a cell phone battery or a small capacity power bank.

In some implementations, the temporary first data source is a local data storage (e.g., a memory chip within the device 102), and the first data source is a remote data storage (e.g., a remote data server).

In some implementations, the temporary storage is a volatile storage medium (such as a RAM and SRAM chip), and the first data source is a non-volatile storage medium (e.g., a DVD disc, a hard drive, or a tape).

In some implementations, the first data source is an enterprise data storage, e.g., provided by 3PAR, SAP, Atempo, Fujitsu, Iron Mountain, Isilon, EMC, DELL, HP, Hitachi Data Systems, IBM, Microsoft, NetApp, Novell, Open-E, Pillar Data Systems, Sun Microsystems, Syneto Storage, Symantec/Veritas Software, or WhipTail.

In some implementations, the first data source is a database, for example, a MICROSOFT SQL Server database, an Oracle database, or a SYBASE database.

In some implementations, the computing device is a mobile computing device. In some implementations, the mobile device is one of: a laptop computer, a tablet computer, a notebook computer, and a smartphone.

In some implementations, loading the first data set from the temporary storage occurs, responsive to a determination that the first data set includes more than a predefine amount of data. For example, in some cases, if data to be displayed on an application page is more than a threshold amount (e.g., 100 MB), a mobile device attempts to reuse data (or a portion thereof) previously stored in the temporary local storage, in order to avoid a re-transmission of these data from a remote storage, thereby avoiding potential network performance bottleneck.

In some implementations, loading the first data set from the temporary storage occurs, responsive to a determination that loading data from the first data resource is unavailable. For example, in some cases, when working in an off-line mode or when no Internet connection is available, a computing device attempts to reuse data (or a portion thereof) previously stored in the temporary local storage, in order to keep the enterprise data processing application functional. These techniques are advantageous: in many cases, a user would view data (e.g., in different forms, using bar charts, pie charts, or tables) more frequently then changing/editing data, and it is therefore important to providing data-viewing functionalities during an off-line mode.

In some implementations, loading the first data set from the temporary storage occurs, responsive to a determination that loading the first data set from the first data source consumes more than a predefine amount of time. For example, in some cases, before retransmitting data from a remote data server, a computing device determines the current network bandwidth (e.g., using a ping command). If the current network bandwidth is less than a threshold amount (e.g., due to a lack of WIFI connections or cellular signal receptions), it may take the computing device more than a predefined amount to re-transmit these data from the remote data server. In these cases, the computing device attempts to reuse data (or a portion thereof) previously stored in the temporary local storage, in order to reduce wait time, thereby increasing application performance.

In some implementations, the enterprise data processing application is a web-based application. For example, as shown in FIG. 5, the enterprise data processing application is a browser-based application, and application pages are web pages, which can be displayed in a web browser.

In some implementations, both the first application page and the second application page are displayed at a same URL. For example, in some cases, although the enterprise data processing application is a browser base application, application pages are not referenced (e.g., accessed) by URLs, unlike common web pages. This is advantageous, because it enhances data security, as unauthorized (unintentionally or otherwise) data access by direct URLs are prevented.

In some implementations, the first application page is associated with a first data processing task, and the deactivating, without closing, the first application page, includes: continuing the first data processing task in background of the enterprise data processing application.

In some implementations, the first application page is associated with a first data processing task, and the re-activating the first application page includes: continuing the first data processing task in foreground of the enterprise data processing application.

In some implementations, the first application page is associated with a first data processing task, and the re-activating the first application page includes: continuing the first data processing task in foreground of the enterprise data processing application.

Figure 8:
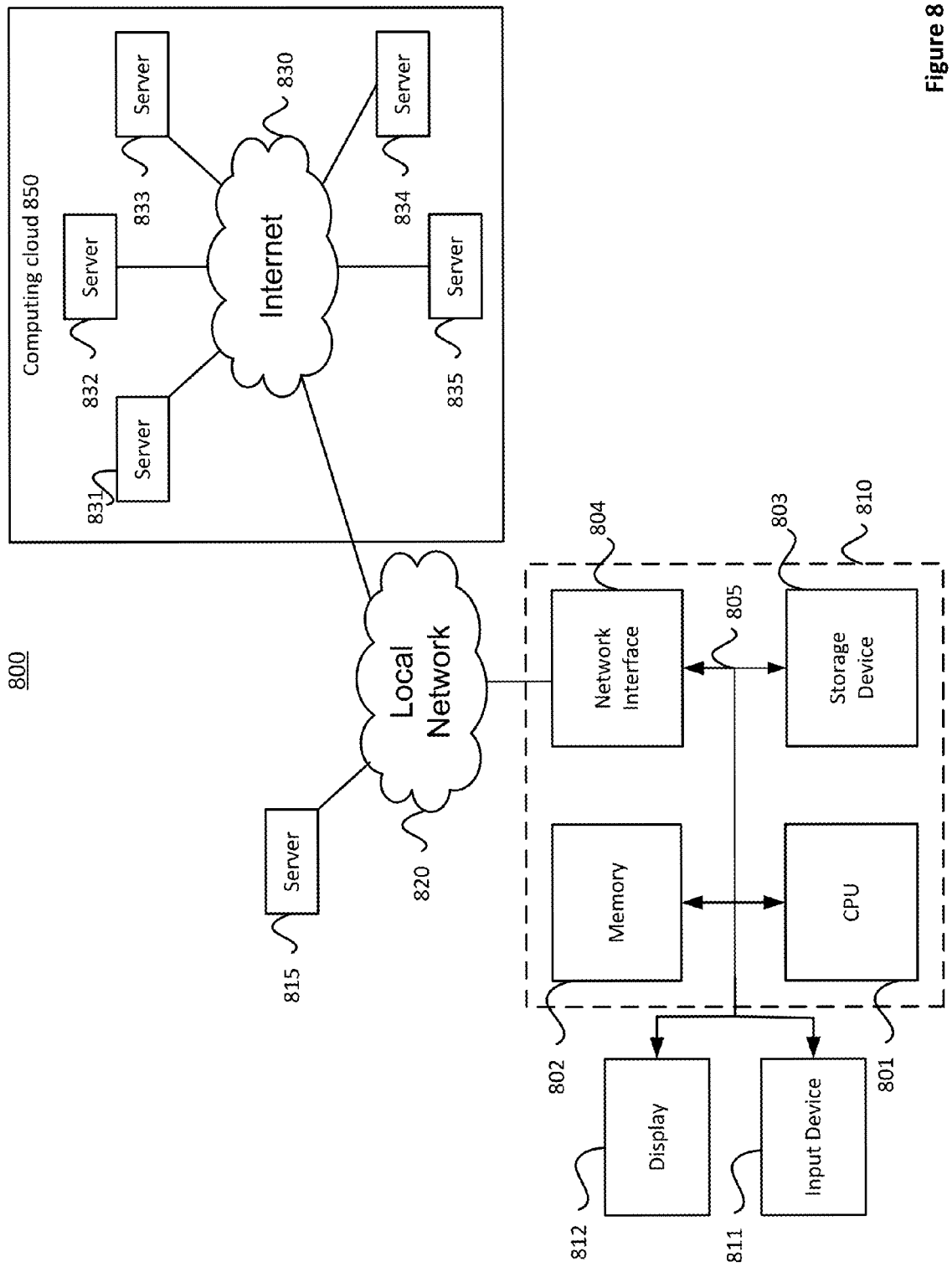
FIG. 8 is an example block diagram illustrating an example computing system for managing enterprise data processing application life cycle in accordance with some implementations.

FIG. 8 is an example block diagram illustrating an example computing system in accordance with some implementations.

As shown in FIG. 8, in some implementations, the computing system 810 includes a bus 805 or other communication mechanism for communicating information, and a processor 801 coupled with the bus 805 for processing information. In some implementations, the computing system 810 also includes a memory 802 coupled to bus 805 for storing information and instructions to be executed by processor 801, including information and instructions for performing the techniques described above, for example. In some implementations, the memory 802 may also be used for storing variables or other intermediate information during execution of instructions to be executed by processor 801. In some implementations, the memory 802 includes, but is not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computing system can obtain information. In some implementations, the storage device 803 may include source code, binary code, or software files for performing the techniques above, for example. The storage device 803 and the memory 802 are both examples of computer readable mediums.

In some implementations, the computing system 810 may be coupled via the bus 805 to a display 812, such as a cathode ray tube (CRT) or liquid crystal display (LCD), for displaying information to a user. An input device 811 such as a keyboard and/or mouse is coupled to the bus 805 for communicating information and command selections from the user to the processor 801. The combination of these components allows the user to communicate with the computing system 810. In some systems, the bus 805 may be divided into multiple specialized buses.

In some implementations, the computing system 810 includes a network interface 804 coupled with the bus 805. In some implementations, the network interface 804 provides two-way data communications between the computing system 810 and the local network 820. In some implementations, the network interface 804 includes a digital subscriber line (DSL) or a modem to provide data communication connection over a telephone line, for example.

Another example of the network interface 804 is a local area network (LAN) card to provide a data communication connection to a compatible LAN. Wireless links are another example. In any such implementation, the network interface 804 sends and receives electrical, electromagnetic, or optical signals that carry digital data streams representing various types of information.

In some implementations, the computing system 810 sends and receives information, including messages or other interface actions, through the network interface 804 across a local network 820, an Intranet, or the Internet 830. In some implementations, the local network, the computing system 810 communicates with a plurality of other computer machines, such as a server 815. In some implementations, the computing system 810 and server computer systems represented by the server 815 form a cloud computing network, which may be programmed with processes described herein. In the Internet example, software components or services may reside on multiple different computing systems 810 or servers 831-835 across the network. In some implementations, the processes described above are implemented at computing cloud 850, which includes one or more servers from the servers 831-835. In some implementations, the server 831 transmits actions or messages from one component, through the Internet 830, the local network 820, and the network interface 804 to a component of the computing system 810. In some implementations, the software components and processes described above are implemented on any computer system and send and/or receive information across a network.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first set could be termed a second set, and, similarly, a second set could be termed a first set, without changing the meaning of the description, so long as all occurrences of the "first set" are renamed consistently and all occurrences of the "second set" are renamed consistently. The first set and the second set are both sets, but they are not the set.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
   at a computing device having one or more processors and memory storing one or more programs for execution by the one or more processors:
   at an enterprise data processing application:
   (A) activating a first application page, including:
      loading a first data set from a first data source, and
      causing the first data set to be displayed on the first application page;
   (B) responsive to a first predefined user action, switching from the first application page to a second application page, by:
      deactivating, without closing, the first application page, including:
         causing the first data set to be stored in a temporary storage, wherein the temporary data source is associated with a greater data transmission speed than that associated with the first data source;
         invoking a page switching animation by an update to an existing plugin component; and
         activating a second application page including display of the page switching animation; and
   (C) responsive to a second predefined user action, switching from the second application page back to the first application page, by:
      deactivating, without closing, the second application page; and
      re-activating the first application page, including:
         loading the first data set from the temporary storage, wherein loading the first data set from the temporary storage consumes less electrical power than loading the first data set from the first data source, and
         causing the first data set to be displayed on the first application page.

2. The method of claim 1, wherein deactivating, without closing, the first application page, includes: placing the first application in background of the enterprise data processing application.

3. The method of claim 1, wherein the temporary first data source is a local data storage, and the first data source is a remote data storage.

4. The method of claim 1, wherein the temporary storage is a volatile storage medium, and the first data source is a non-volatile storage medium.

5. The method of claim 1, wherein the first data source is an enterprise data storage.

6. The method of claim 1, wherein the first data source is a database.

7. The method of claim 1, wherein the computing device is a mobile computing device.

8. The method of claim 7, wherein the mobile device is one of: a laptop computer, a tablet computer, a notebook computer, and a smartphone.

9. The method of claim 1, wherein loading the first data set from the temporary storage occurs, responsive to a determination that the first data set includes more than a predefine amount of data.

10. The method of claim 1, wherein loading the first data set from the temporary storage occurs, responsive to a determination that loading data from the first data resource is unavailable.

11. The method of claim 1, wherein loading the first data set from the temporary storage occurs, responsive to a determination that loading the first data set from the first data source consumes more than a predefine amount of time.

12. The method of claim 1, wherein the enterprise data processing application is a web-based application.

13. The method of claim 12, wherein both the first application page and the second application page are displayed at a same URL.

14. The method of claim 1, wherein the first application page is associated with a first data processing task, and
   the deactivating, without closing, the first application page, includes:
      continuing the first data processing task in background of the enterprise data processing application.

15. The method of claim 1, wherein the first application page is associated with a first data processing task, and
   the re-activating the first application page includes:
      continuing the first data processing task in foreground of the enterprise data processing application.

16. The method of claim 1, wherein the first application page is associated with a first data processing task, and
the re-activating the first application page includes:
continuing the first data processing task in foreground of the enterprise data processing application.

17. A non-transitory computer readable storage medium storing one or more programs, the one or more programs comprising instructions, which when executed by a computing system with one or more processors, cause the computing system to execute a method of:
at an enterprise data processing application:
(A) activating a first application page, including:
loading a first data set from a first data source, and
causing the first data set to be displayed on the first application page;
(B) responsive to a first predefined user action, switching from the first application page to a second application page, by:
deactivating, without closing, the first application page, including:
causing the first data set to be stored in a temporary storage, wherein the temporary data source is associated with a greater data transmission speed than that associated with the first data source;
invoking a page switching animation by an update to an existing plugin component; and
activating a second application page including display of the page switching animation; and
(C) responsive to a second predefined user action, switching from the second application page back to the first application page, by:
deactivating, without closing, the second application page; and
re-activating the first application page, including:
loading the first data set from the temporary storage, wherein loading the first data set from the temporary storage consumes less electrical power than loading the first data set from the first data source, and
causing the first data set to be displayed on the first application page.

18. A computing system, comprising:
one or more processors;
memory; and
one or more programs, wherein the one or more programs are stored in the memory and configured to be executed by the one or more processors, the one or more programs including instructions for:
at an enterprise data processing application:
(A) activating a first application page, including:
loading a first data set from a first data source, and
causing the first data set to be displayed on the first application page;
(B) responsive to a first predefined user action, switching from the first application page to a second application page, by:
deactivating, without closing, the first application page, including:
causing the first data set to be stored in a temporary storage, wherein the temporary data source is associated with a greater data transmission speed than that associated with the first data source;
invoking a page switching animation by an update to an existing plugin component; and
activating a second application page including display of the page switching animation; and
(C) responsive to a second predefined user action, switching from the second application page back to the first application page, by:
deactivating, without closing, the second application page; and
re-activating the first application page, including:
loading the first data set from the temporary storage, wherein loading the first data set from the temporary storage consumes less electrical power than loading the first data set from the first data source, and
causing the first data set to be displayed on the first application page.

* * * * *